June 12, 1951          F. BISZANTZ          2,556,610
STABILIZER FOR LARGE TRUCKS OR TRAILERS
Filed Nov. 28, 1945          3 Sheets-Sheet 1
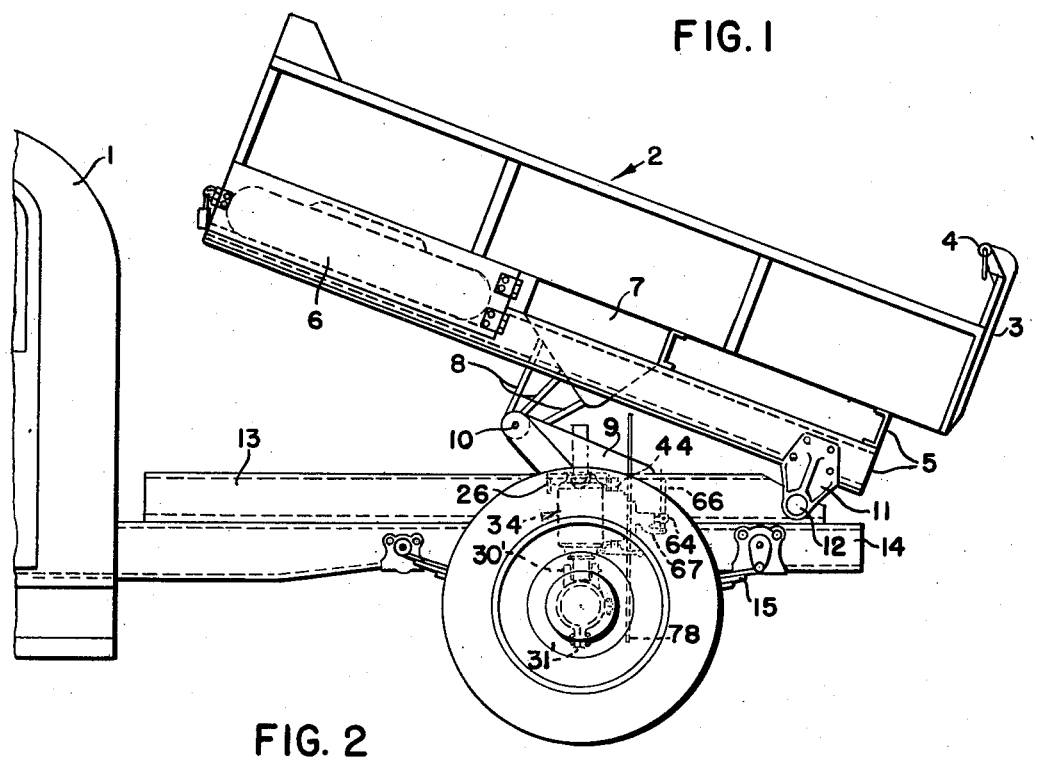
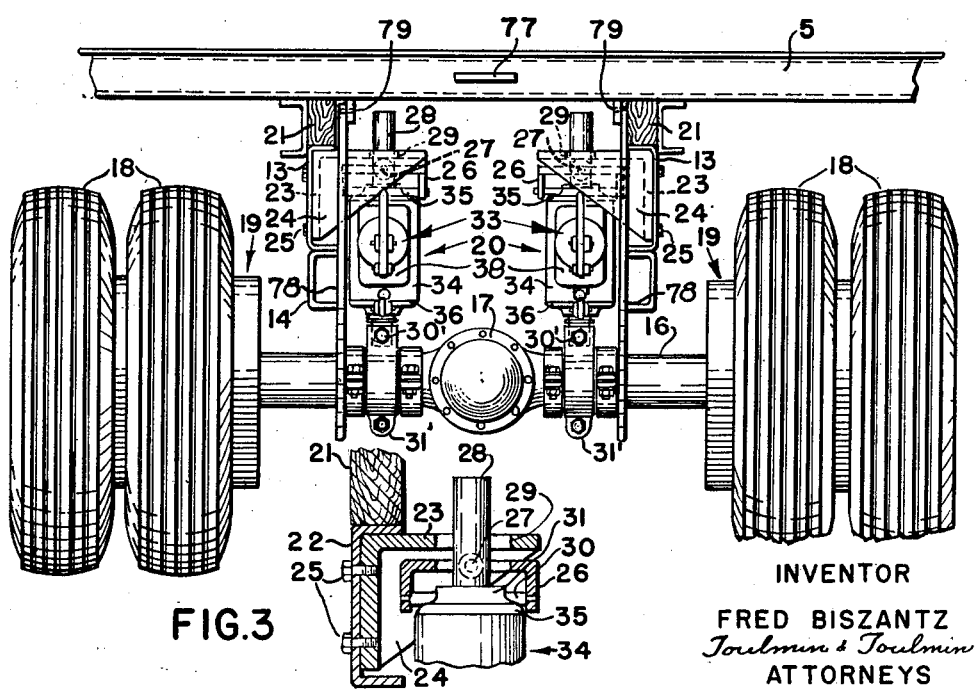
INVENTOR
FRED BISZANTZ
Toulmin & Toulmin
ATTORNEYS

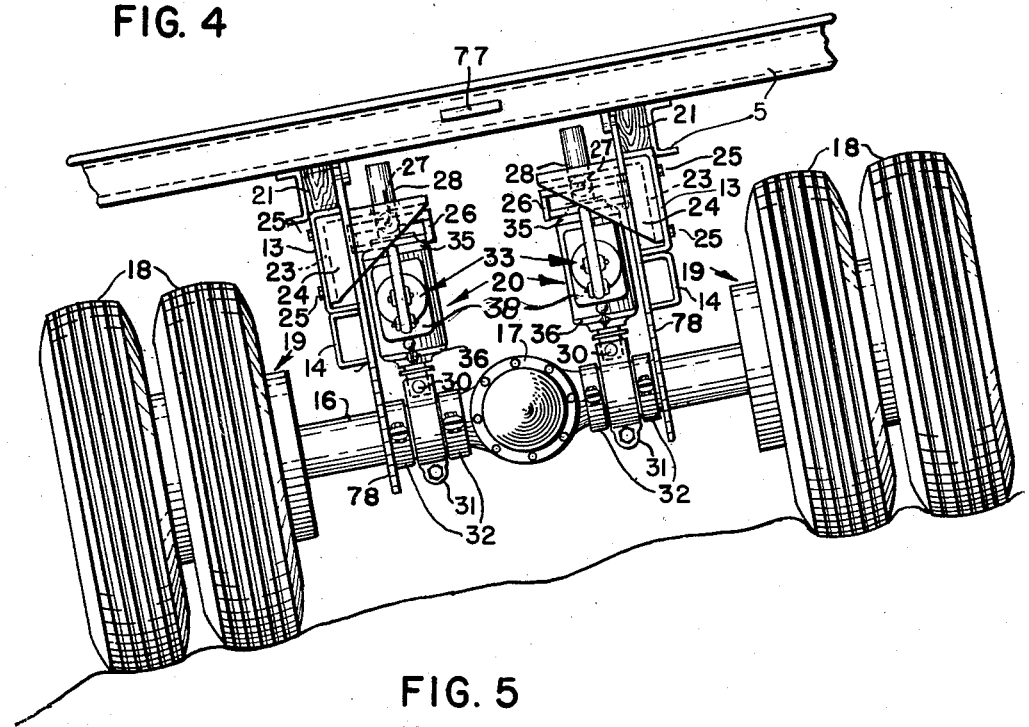

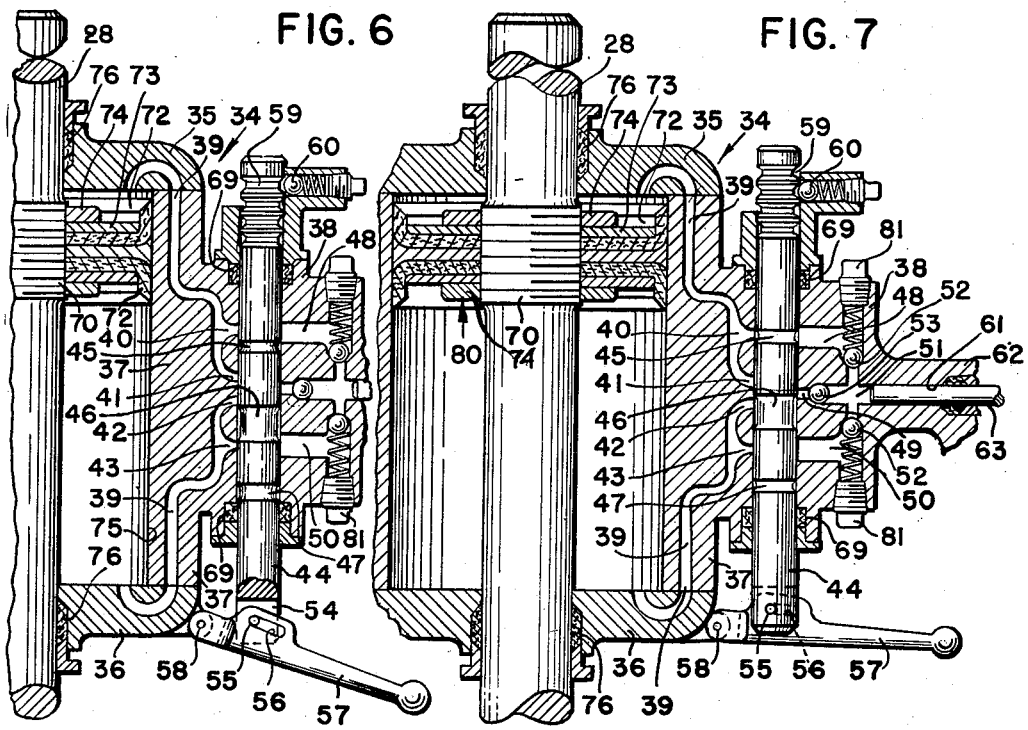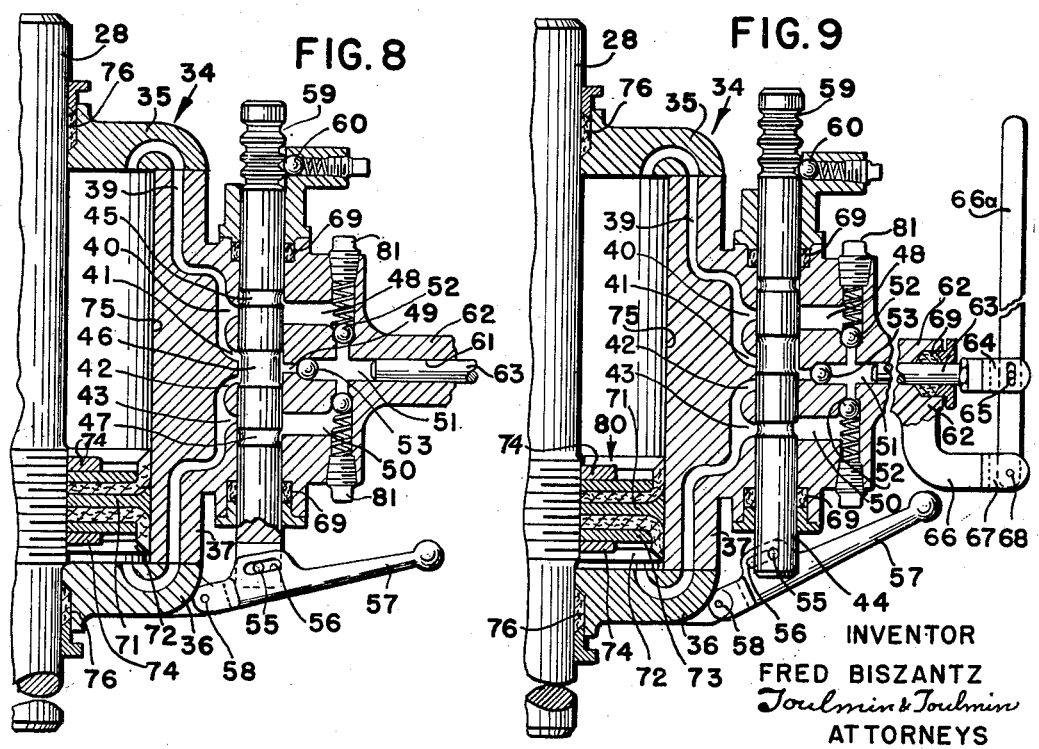

Patented June 12, 1951

2,556,610

UNITED STATES PATENT OFFICE 2,556,610

STABILIZER FOR LARGE TRUCKS OR TRAILERS

Fred Biszantz, Galion, Ohio, assignor to The Galion Metallic Vault Company, Galion, Ohio, a corporation of Ohio Application November 28, 1945, Serial No. 631,238

8 Claims. (Cl. 280—6)

The present invention relates to vehicle structure and more especially to large trucks or trailers.

Trucks or trailers on which dump bodies have been mounted are used at times for spreading stone or other heavy aggregate on roadways. The roadways are not always level or even smooth, i. e. devoid of bumps, consequently these long bodies, when raised to an angle of from 30° to 50°, will sway sidewise to an alarming extent on sideling roadways if there are no means for stabilizing the frame or holding it nearly level other than the usual springs.

The primary object of the invention is to provide an improved truck or trailer structure, preferably in the form of an accessory than can be applied to standard types of trucks or trailers and by which the frame of the truck or trailer is maintained level when the body is raised through a considerable angle.

Another object is to provide an improved truck or trailer on which a dump body is mounted for spreading stone and other heavy aggregate on roadways, and in which the frame of the truck or trailer is stabilized to prevent sidewise sway during the dumping or spreading operation.

Still another object is to provide an improved dump truck or trailer with an improved frame stabilizing accessory and in which the stabilizer does not interfere with the normal operation of the springs under the truck in moving the truck to the work area.

A further object is to provide an improved stabilizer for a dump truck or trailer in which a hydraulic medium is employed for stabilization purposes and such medium is controlled by suitably positioned valves.

Another object is to provide a stabilizing mechanism of the type referred to in which the hydraulic medium, the hydraulic cylinders and valves are entirely independent of the ordinary hydraulic check or shock absorber used on trucks.

Still another object is to provide a stabilizer for dump trucks and trailers of the hydraulic operating type and in which the pressure fluid is employed to lock the dump body in a predetermined position or at a predetermined angle during the dumping or spreading operation.

Other objects and features will be apparent as the specification is perused in connection with the accompanying drawings in which:

Figure 1 is an elevational view of a conventional dumping or spreading truck provided with the improved stabilizer accessory.

Figure 2 is an enlarged view looking from the rear end of the truck shown in Figure 1, but with the body and cab removed and showing the rear view of the stabilizing mechanism.

Figure 3 is a fragmentary sectional view, partly in elevation, showing the details of the structure by which the stabilizing cylinder accessory is supported from the frame of the truck.

Figure 4 depicts the rear view of a conventional dumping truck provided with the improved stabilizing mechanism, but before this mechanism has been adjusted, and showing the position of the main frame, with the body and cab removed, when the truck is travelling over a sideling road.

Figure 5 is a view similar to Figure 4, but showing the manner in which the stabilizing mechanism can be operated to level the frame of the truck notwithstanding a considerable slope of the ground over which the truck is travelling.

Figures 6 to 9 inclusive, are vertical sectional views of the operating cylinder and valve mechanism by which hydraulic power is supplied to the stabilizing plungers. The latter, also the piston valve and the operating handle, is shown in elevation. The valves are depicted in the various figures as being in different operating positions to produce proper sequence of operation at the plunger.

Referring particularly to Figure 1, reference character 1 designates the cab of the dump truck, the body of which is generally indicated at 2. The truck has built-up iron sides and is provided at the rear end with a door 3 which swings about a pivot 4. The bottom of the body is mounted on a plurality of transversely extending and longitudinally extending U-shaped beams 5 welded or otherwise secured together to form a rigid frame. A lower forward compartment may contain a spare tire 6. A heavy plate 7 may extend downwardly from the body 2 to which is attached suitable mechanism indicated by the ribbed plate 8 for raising and lowering the body. This plate 8 is attached to a heavy crank arm 9 pivoted to plate 8 at 10 and this arm is adapted to be swung in the vertical direction, preferably by hydraulic power furnished through a pump and a hydraulic motor (not shown). This pump is operated from the engine of the truck and controlled by suitable levers (not shown). The longitudinal frame members 5 of the truck are provided at each side, toward the rear, with a pair of heavy downwardly extending webs 11, pivoted at 12 to a pair of spaced U-shaped beams 13 which are secured to the main frame or platform 14 of the truck.

Thus, by moving the operating handle which controls the valve mechanism (not shown) of the hydraulic motor, the dump body 2 can be raised to any predetermined angle, usually between 30° and 50° depending on the amount of incline necessary for the contents of the body 2 to slide rearwardly through the open door. The main frame or platform 14 of the truck is spring mounted at the rear end as indicated by the leaf springs 15 on the main rear axle housing 16. The spring mechanism 15 is secured to the main frame in the conventional manner.

The axle housing 16 is provided at the center with a differential housing 17 and the axle contained in these housings carries preferably a pair of tires 18 at each end, together with suitable brake mechanism indicated generally at 19.

When the housings 16 and 17 are supported from the main frame 14 solely through the leaf springs 15 as in a conventional truck and assuming that the truck is travelling a road which has considerable slope, the main frame 14 of the truck assumes practically the same transverse slope as that of the road because the springs 15 offer little or no self-equalizing effect. Such a position has been depicted in Figure 4, in which it will be noted that the cross beam of the main frame is at substantially the same angle as the roadway. However, by the use of the improved stabilizing mechanism which is about to be described, the main frame 14 of the truck can be maintained in a strictly horizontal level position regardless of the slope of the road so that the sway of the body 2 when in elevated or its down position can be substantially eliminated.

*Stabilizing mechanism*

The stabilizing mechanism is indicated generally at 20 in Figures 2, 4 and 5. Each stabilizer, of which there are preferably two per truck, is secured to the inner surface of the U-shaped beams 13. For this purpose, a pair of spaced heavy joists 21 extending between two cross frame members may be employed. An angle iron 23 having side plates 24 of triangular shape may be fitted within the U-shaped beam 13 and secured thereto by screws 25. A round cap member 26 loosely receives the piston rod 28 of the stabilizer, this cap member being swivelly connected at each side as indicated at 27 to the triangular plates 24. The upper leg of the triangular member 23 has an opening 29 therein which loosely receives the rod 28. This opening 29 is somewhat larger than the size of the piston 28. This double swivel connection provides a certain amount of support to the upper part of the piston 28 and the cylinder 34, and at the same time prevents any jamming effects when the piston moves with respect to the cylinder. The cap 26 is provided with a swivel rod 30 extending diametrically across the flange of the cap and is loosely received by an extension 31 formed on the top of the cylinder 34. Thus, the cylinder 34 is adapted freely to pivot relative to its supporting bracket 23. The purpose of this universal joint will be apparent when the operation of the entire stabilizer has been explained.

The lower end of the cylinder 34 is left free so that it is entirely supported from the rod or pin 30. However, the piston rod 28 is extended through the lower end of the cylinder and is swivelly connected as indicated at 30' to a clamping device 31' which extends about the housing 16. If the housing is split near the position of the differential, it may also be desirable to provide additional clamping devices 32 on each side of the clamp 31'.

A valve mechanism indicated generally at 33 may be secured to the cylinder 34 for controlling the admission of pressure fluid to the cylinder on opposite sides of the piston. The details of the valve mechanism and also of the cylinder and its contained piston, are shown in Figures 6 to 9 inclusive. As indicated in these figures, the cylinder may comprise a pair of end plates 35, 36 secured in any suitable manner to a cylindrical element 37. There is a large square boss or projection 38 extending from the cylindrical member 37 toward the rear of the truck to provide facility of operation. This projection, together with the cylindrical casing 37, is provided with a number of passageways indicated at 39 which terminate in a plurality of twin branches 40, 41, 42 and 43 to form ports. A valve piston 44 extends vertically through the projection 38 in a slidable manner, this piston having a series of grooves 45, 46 and 47.

There are passageways 48, 49 and 50 on the opposite side of the piston rod from the ports 40 to 43 inclusive. These passageways are interconnected through a common passageway 51. Spring pressed check valves 52 are seated in the upper and lower portions of the passageway 51 to close off the ports 48 and 50 under certain circumstances. An ordinary ball check 53 is positioned in the middle passageway 51 to close off port 49 when desired. The lower end of the piston rod 44 is provided with a flat portion 54 which carries a pin 55. This pin is adapted to slide in a slot 56 formed in an extension of a hand operated lever 57. The inner end of this lever is pivoted at 58 to the lower end plate 36 of the cylinder casing. The upper end of the valve rod 44 is provided with any suitable number of grooves 59, adjacent one another, and these grooves are adapted separately to receive a spring urged steel ball 60. Thus, by moving the handle 57 in a vertical direction, the valve rod or stem 44 can be moved upwardly to assume any one of four positions determined by the entry of the ball 60 into one of the grooves 59. The compartment 51 has a cylindrical extension 61 directed away from the port 49 and contained within a projection 62 formed integral with the boss 38. A piston rod 63 is snugly, but slidably received by the opening 61 and this rod terminates in a bifurcated yoke member 64. A pivot rod 65 is provided in the yoke member 64 and a lever 66a is swingingly mounted on the pivot. The projection 62 has a downwardly and outwardly extending lug 66 which also terminates in a bifurcated portion 67 and to which the lever 66a is pivotally secured as indicated at 68. Thus, by grasping the upper portion of the lever 66 and causing it to swing about its pivot 68, the piston rod 63 can be reciprocated in the cylindrical opening 61 so that the effect of a force piston is obtained. It is apparent that suitable packing and if necessary, properly designed glands should be used at any place where there is a tendency to leak as indicated at 69.

The piston rod 28 is slidably carried by two openings at opposite ends of the cylinder 34 and threads 70 are provided at an intermediate position on the rod. Any type of flexible piston can be secured to the rod 28 in any suitable manner. As typified in the drawings, a central support plate 71 of annular shape may be employed, this plate serving to carry at each side a cup shaped leather washer 72 held in position by a clamp plate 73 and an annular nut 74 which is received by the threads 70. Thus, by tightening each of the nuts 74, the leather washers are compressed and caused to squeeze outwardly against the working face 75 of the casing 34. Suitable packing devices 76 may be provided at each end of the casing to prevent leakage of fluid along the piston rod 28.

*Operation of the stabilizing mechanism*

Assume that a truck equipped with the improved stabilizer is travelling on a road which has considerable slant, as indicated in Figures 4 and 5, and the operator knows that when the truck body 2 is swung to its elevated position for spreading, a dangerous sway will be encountered, he immediately stops the truck and either visionally or by means of devices about to be described, determines the angle that the truck frame 14 is inclined with respect to the horizontal plane. To assist in this operation, a spirit level 77 may be provided on the truck frame from which the angle of inclination can be roughly estimated. If desired, a pair of measuring bars 78 (Figure 2) may be pivoted to the frame as indicated at 79 and swung downwardly against the housing 16 on each side of the differential housing 17.

There is provided a spirit level 77 secured to some convenient part of the truck frame at the rear end thereof so that the operator can tell when the truck body is substantially level. In case it is desired to preset the truck body to some angularity, the bars 78 may be availed of for indicating how much the truck body is tilted relative to the axle.

Assume, for example, that he finds it desirable to elevate that portion of the frame to the left as shown in Figure 4 and thus, to elongate the length of piston rod projecting out of the bottom of the stabilizing cylinder 34. To do this, he first obtains the proper setting of the valve rod or stem 44 by operating the handle 57 to bring the second notch from the top of the valve rod into engagement with the ball 60 as shown in Figure 7. The operator then quickly moves the lever 66a to and fro, causing the small piston rod 63 to reciprocate within its cylinder 62.

Assuming that the cylinders 34 and all the passageways leading through projection 38 are filled with a fluid, such as oil, pressure of considerable intensity is applied to the pressure fluid by the piston rod 63. The grooves 45, 46 and 47 of the valve stem 44 are so related with respect to one another and with respect to the adjacent ports that in the position of the valve stem shown in Figure 7, pressure fluid will pass through the compartment 51, past the upper ball 52, through the port 48, the groove 45 of the valve stem, through the port 40 and the upper passageway 39 to the upper side of the main piston. The pressure fluid below this piston is exhausted through the lower passageway 39, through the port 42 and the groove 46 of the valve stem, through the port 49, past the ball check 53 and from there it is forced by the piston 63 to the upper side of the main piston as explained above. Consequently, by rapidly swinging the lever 66 back and forth, the main piston generally indicated at 80 is caused to move downwardly with respect to the main cylinder 34 and the piston rod 28 is caused to extend to a greater distance below the main cylinder. Inasmuch as the casing 34 is effectively secured in the vertical direction with respect to the truck frame 5, a downward movement on the piston 28 will cause an upward movement of the frame 5 of the truck.

On the other hand, assume that the operator desires to lower the right hand end of the frame as shown in Figures 4 and 5, he operates the handle 57 to move the valve stem 44 so as to cause the ball 60 to engage the lowermost notch of the stem as shown in Figure 9. Under these circumstances, as the lever 66a is rapidly swung right and left pressure fluid from the upper side of the piston 80 exhausts through the upper passageway 39 to the port 41, thence through the groove 46 past the ball 53 into compartment 51 where the pressure exerted by the piston rod 63 causes the fluid to force the lower ball 52 against its spring. The fluid then passes through the port 50, through the groove 47 and the lower passageway 39 to the lower side of the piston. As the piston raises, the rod 28 is pulled upwardly and, therefore, reduces the distance between the cylinder 34 and the clamp ring 31 of the axle housing. Thus, the right hand end of the frame 14 is caused to move downwardly.

It is, therefore, seen that by properly manipulating the valve handle 57 and providing a hand pump lever 66, the distance between the cylinder 34 and the rear axle housing of the truck can be adjusted in any desired manner. This adjustment will be continued until the spirit level 77 indicates that the frame, and therefore the truck body, is horizontal or on an even keel notwithstanding considerable slope in the roadway.

After having brought the frame to a horizontal level, it is desirable that the adjustments or rather the position of the piston 80 shall remain strictly at its adjusted position while the truck is travelling over the sloping road. It will be understood that in the case of severe jolts the piston rod 28 may have a tendency to move slightly even though no change in the position of the handle 57 has been made. For this reason, a "hold" position of the piston is provided for which pressure is maintained on both sides of the piston in its adjusted position and the pressure fluid is locked in place.

Referring now to Figure 6, assuming that the lever 57 has been positioned downwardly so that the ball 60 engages the top groove 58, it will be noted that the solid portions of the valve piston 44, i. e. those portions on opposite sides of the grooves 45, 46 and 47 now bridge the ports 40, 41, 42 and 43 so that the pressure fluid is trapped on both sides of the piston 80.

After the truck frame has been swung to a horizontal position by proper manipulation of the valve lever 57 and the latter is moved to the "hold" position shown in Figure 6, the operator then proceeds to elevate the truck to the required inclination and to move the truck over the ground in order to spread the contents of the truck. When the truck body has been lowered from its dumping position at the end of the spreading operation, the truck leaves the work area and upon reaching level ground, the operator then moves valve lever 57 in the proper direction and operates the hand pump at lever 16 to swing the frame members 5 into parallel position with respect to the axle housing. The spirit level 77 or the measuring bars 78 may again be consulted to establish this parallel or level position.

Inasmuch as any one of the valve conditions shown in Figures 6, 7 and 9 may be still in effect after the time that the frame 5 has been brought into parallel relation with the rear housing 16, the piston rod 28 obviously constitutes a rigid connection between the housing and the frame of the truck. Consequently, the function of the springs 15 may have been rendered useless in providing flexibility of support over the rear axle during the trip of the truck from the work area to the supply area. It is, therefore, desirable completely to free the piston 28 of any locking or holding effect so that the link connection between the frame and the housing will be temporarily broken.

This can be done by the use of a forward position of the valve stem 44, as shown in Figure 8, in which the stem is moved upwardly by the handle 57 until the ball 60 engages the third groove from the top of the stem. It will be noted under these conditions that there is a direct connection between the upper passageway 39 through the port 41, the groove 46 and port 42, to the lower passageway 39. Thus, the upper and lower surfaces of the piston 80 are directly in communication with one another and the piston rod 28 rides freely within the cylinder 34. Under these conditions, there can be no interference with the springiness or flexibility accorded by the elements 15 since the elevating and lowering link stabilizers are temporarily rendered inoperative.

It will be noted that the hydraulic system, including the valve mechanism forming the operating medium of each stabilizer, is completely closed and is entirely separate from any other hydraulic system, such as hydraulic shock absorbers or body elevating mechanism, that may be used in the operation of the truck. By permitting the piston rod 28 to extend through both ends of the cylinder, there is no oil displacement and the cylinder will always be full of pressure fluid and consequently, no other tank or reservoir will be required. Inasmuch as the upper part of the piston 28 may extend for considerable distance out of the cylinder 34, depending on the length of the stabilizer link that is required, it may be necessary to provide a non-freezing or jamming support at this point and a structure similar to that shown in Figure 3 may be used to advantage. As explained hereinbefore, a universal joint is afforded between the support of the piston 28 and the cylinder on the one hand and the angle iron 23 on the other hand due to the presence of the two swivels 27 and 30, and the fact that the opening 29 is somewhat larger than the size of the piston 28.

The cylinder can be filled with the pressure fluid, which is normally oil, through either one of the screw plugs 81, assuming that the valve stem 44 is in the correct position to provide access to either one or both of the passageways 39. Any leakage of fluid can obviously be made up in the same manner or in any other suitable way, depending on the construction of the cylinder 34 and the presence of oil filling openings therein.

From the foregoing, it is evident that I have disclosed an improved structure by which a dump or spreading truck or trailer can be set on an even keel or in a horizontal position during the spreading operation, even in the case of sideling roadways having considerable slope. The sidewise sway of the truck or trailer is completely eliminated by the use of the stabilizers and there is also provision by which the ordinary springs of the truck are still permitted to function when the stabilizers are not in active use. The stabilizers may constitute an accessory which can be readily applied to all standard forms of dumping or spreading trucks or trailers and the actuating piston and control valve and auxiliary elements may all be formed into a single integral unit in order to facilitate attachment to the truck. Due to the smallness of the piston 63, it becomes a relatively simple matter to operate the hand lever 66 to obtain the necessary change in the length of the stabilizer links between the truck frame and the rear axle housing.

It will be understood that I desire to comprehend within my invention such modifications as come within the scope of the claims and the invention.

Having thus fully described my invention, what I claim as new and desire to secure by Letters Patent is:

1. In a truck having a pair of rear wheels, and an axle structure carrying said wheels, a dump body, and spring means mounting said body on said axle; a pair of independently manually operable hydraulic mechanisms for adjusting the angular relation between said body and said axle structure, each of said mechanisms comprising a pair of movable parts one of which is connected with said body and the other of which is connected with said axle structure, means selectively adjustable for permitting free relative reciprocation between said parts or for locking said parts together, and means for adjusting the relative positions of said parts.

2. In a truck having a pair of rear wheels, and an axle structure carrying said wheels, a dump body, and spring means mounting said body on said axle; a pair of independently manually operable hydraulic mechanisms for adjusting the angular relation between said body and said axle structure, each of said mechanisms comprising a pair of movable parts one of which is connected with said axle structure and the other of which is connected with said body, means selectively adjustable for permitting free relative reciprocation between said parts or for locking said parts together, and means for adjusting the relative positions of said parts, said hydraulic mechanisms being mounted on opposite sides of the midpoint of said axle structure and body.

3. In a truck having a pair of rear wheels, an axle carrying said wheels, a dump body, and spring means mounting said body on said axle, and a pair of independent devices for adjusting the angular relation between said body and axle, said devices each comprising a hydraulic cylinder and a piston rod within said cylinder, one of said cylinders and rod being connected with said body and the other with said axle, a manually operable hydraulic means associated with each said device for changing the relative position of said piston rod and cylinder thereof and independently of the other device, said manually operable hydraulic means including a pump for exchanging fluid between opposite ends of said cylinder for bringing about movement of said piston rod relative thereto, and valve means selectively operable for entrapping fluid in said cylinder for locking said piston rod in position relative thereto or for providing free flow of fluid between opposite ends of said cylinder, whereby said cylinder and piston rod can reciprocate relatively freely when said body and axle move relatively due to the action of said spring means.

4. In a truck having a pair of rear wheels; an axle carrying said wheels, a dump body, and spring means mounting said body on said axle; devices for adjusting the angular relation between said body and axle, said devices comprising cylinders pivotally carried by said body in spaced relation, a piston rod within each said cylinder having one end pivotally anchored to said axle, an independent manually operable hydraulic means for each device for changing the position of said piston rod thereof relative to said cylinder thereof, and a valve associated with each cylinder and selectively operable for controlling the flow of fluid to and from opposite ends thereof to control the direction of movement of said piston rod relative to its cylinder by operation of said manually operable hydraulic means, said valve also being operable for entrapping fluid in said cylinder for locking said piston rod in any predetermined position relative thereto or for freely hydraulically connecting the opposite ends of said cylinder to permit free relative reciprocation between said cylinder and the piston rod therein.

5. In a truck having a pair of rear wheels, an axle carrying said wheels, a dump body and spring means mounting said body on said axle; a pair of devices for adjusting the angular relation between said body and axle, each said device comprising a cylinder pivotally mounted on said body, a piston rod within said cylinder and having one end pivotally secured to said axle, a manually operable hydraulic pump on each said cylinder operable for causing movement of the said piston rod therein, and a valve on each cylinder for controlling the direction of movement of the piston rod therein as brought about by actuation of the associated pump, said valve also being adjustable for entrapping fluid in the said cylinder to lock the piston rod in position relative thereto and also having a position where the opposite ends of said cylinder are connected together to permit free relative reciprocation between said cylinder and the piston rod therein.

6. In a truck having a pair of rear wheels, an axle carrying said wheels, a dump body, and spring means mounting said body on said axle, a pair of independent hydraulic mechanisms disposed between said body and axle on opposite sides of the center point thereof, each of said mechanisms comprising a hydraulic cylinder swively connected with said body for pivoting movement relative thereto in two planes, a double acting piston having equal areas on its opposite faces within said cylinder and pivotally connected with said axle, manually operable hydraulic pumping means on each cylinder for changing the position of the said piston rod therein, and valve means on each cylinder hydraulically connected between the said pump thereon and the opposite ends of the said cylinder and selectively adjustable for reversibly connecting said pump with the said faces of said piston, for entrapping fluid against said faces, or for hydraulically interconnecting said faces.

7. In a truck having a pair of rear wheels, an axle carrying said wheels, a dump body, and spring means mounting said body on said axle; a pair of self-contained hydraulic mechanisms disposed between said body and axle on opposite sides of the center point thereof, each of said mechanisms comprising a cylinder pivotally carried by said body, a piston rod extending completely through said cylinder and having one end pivotally anchored to said axle, a piston on said rod in said cylinder, manually operable hydraulic pumping means on each cylinder for changing the position of said piston and rod therein, and a valve on each cylinder for connecting the opposite ends thereof alternately to the suction and discharge sides of the said pump on the cylinder, for hydraulically connecting the opposite of the said cylinders together, and for entrapping fluid in the said opposite ends.

8. In a stabilizer of the character described; a cylinder, means for pivotally mounting said cylinder on a truck body, a piston having its opposite faces equal and reciprocal in said cylinder, a piston rod carried by said piston and adapted for pivotal connection with an axle, said cylinder being formed with passageways leading to the opposite ends thereof, a manually operable pump associated with said passageways and operable for causing a hydraulic medium in said cylinder to flow through said passageways from one side of said piston to the other, and a valve in said cylinder for controlling said passageways, said valve being selectively adjustable for reversibly connecting said pump with said passageways, for closing off said passageways to entrap fluid in the opposite ends of said cylinder, and for connecting said passageways together to provide free passage of fluid between opposite ends of said cylinder.

FRED BISZANTZ.

REFERENCES CITED

The following references are of record in the file of this patent:

UNITED STATES PATENTS

| Number | Name | Date |
|---|---|---|
| 894,933 | Benson | Aug. 4, 1908 |
| 1,975,119 | Oates | Oct. 2, 1934 |
| 1,983,444 | Dry | Dec. 4, 1934 |
| 2,148,504 | Richter | Feb. 28, 1939 |
| 2,235,136 | Barrett | Mar. 18, 1941 |
| 2,278,081 | Kramer | Mar. 31, 1942 |
| 2,306,284 | Shonnard | Dec. 22, 1942 |
| 2,324,587 | Krogh | July 20, 1943 |
| 2,365,387 | Briscoe | Dec. 19, 1944 |
| 2,369,545 | Dunn, Jr. | Feb. 13, 1945 |

FOREIGN PATENTS

| Number | Country | Date |
|---|---|---|
| 240,409 | Switzerland | June 1, 1946 |